(12) United States Patent
Kuehnle

(10) Patent No.: US 9,495,609 B2
(45) Date of Patent: Nov. 15, 2016

(54) SYSTEM AND METHOD FOR EVALUATING DATA

(71) Applicant: Bendix Commercial Vehicle Systems LLC, Elyria, OH (US)

(72) Inventor: Andreas U. Kuehnle, Villa Park, CA (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 122 days.

(21) Appl. No.: 14/266,402

(22) Filed: Apr. 30, 2014

(65) Prior Publication Data
US 2015/0317536 A1    Nov. 5, 2015

(51) Int. Cl.
| G06K 9/00 | (2006.01) |
| G06K 9/52 | (2006.01) |
| G06K 9/46 | (2006.01) |
| G06K 9/62 | (2006.01) |
| G06T 7/00 | (2006.01) |

(52) U.S. Cl.
CPC ............. *G06K 9/52* (2013.01); *G06K 9/00805* (2013.01); *G06K 9/00825* (2013.01); *G06K 9/4604* (2013.01); *G06K 9/6231* (2013.01); *G06T 7/0042* (2013.01); *G06T 2207/20016* (2013.01); *G06T 2207/30252* (2013.01)

(58) Field of Classification Search
None
See application file for complete search history.

(56) References Cited

U.S. PATENT DOCUMENTS

| 3,069,654 | A | 12/1962 | Hough |
| RE36,656 | E | 4/2000 | Califano et al. |
| 6,952,449 | B2 | 10/2005 | Kawada et al. |
| 7,283,645 | B2 | 10/2007 | Krumm et al. |
| 7,453,939 | B2 | 11/2008 | Pan et al. |
| 7,738,730 | B2 | 6/2010 | Hawley |
| 8,150,207 | B2 | 4/2012 | Li et al. |
| 8,180,158 | B2 | 5/2012 | Wu et al. |
| 8,280,158 | B2 | 10/2012 | Adcock et al. |
| 8,363,972 | B1 | 1/2013 | Silver et al. |
| 8,768,071 | B2 * | 7/2014 | Tsuchinaga .......... G06K 9/6857 382/226 |
| 8,810,779 | B1 * | 8/2014 | Hilde ................. G06K 9/00214 356/3.01 |
| 8,948,454 | B2 * | 2/2015 | Datta ................... G06K 9/6256 382/103 |
| 9,098,741 | B1 * | 8/2015 | Anguelov .......... G06K 9/00536 |
| 2005/0213667 | A1 | 9/2005 | Aldrich et al. |
| 2008/0043831 | A1 | 2/2008 | Sethuraman et al. |
| 2013/0185131 | A1 | 7/2013 | Sinha et al. |

FOREIGN PATENT DOCUMENTS

WO    2013009697 A1    1/2013

OTHER PUBLICATIONS

Combinatorial Optimization webpage at http://en.wikipedia.org/wiki/Combinatorial_optimization; webpage last modified Mar. 20, 2014, printed Apr. 30, 2014.

* cited by examiner

*Primary Examiner* — Soo Park
(74) *Attorney, Agent, or Firm* — Brian E. Kondas; Cheryl L. Greenly; Eugene E Clair

(57) ABSTRACT

A method for identifying a best item among a plurality of respective different items includes selecting a current best score, identifying a set of attributes associated with each of the items, and for each of the sets of attributes: determining a best possible score for a subset of the set of attributes, if the best possible score is greater than the current best score, determining an actual score for the set of attributes, and if the actual score for the set of attributes is greater than the current best score, setting the current best score as the actual score for the set of attributes. After both of the determining steps and the setting step for each of the sets of attributes, the item associated with the current best score is identified.

24 Claims, 9 Drawing Sheets

SYSTEM AND METHOD FOR EVALUATING DATA

BACKGROUND

The present invention relates to evaluating image data for identifying an object. It finds particular application in conjunction with reducing the calculations and time necessary for identifying the object and will be described with particular reference thereto. It will be appreciated, however, that the invention is also amenable to other applications.

Algorithms used for evaluating images can be quite computationally intensive. Reducing the number of computations while maintaining image recognition quality helps reduce the amount of time, computer processing power, and computer hardware necessary for evaluating and processing images. Some of the techniques for reducing the number of computations and time for evaluating images involve determining when enough computations have been completed to avoid further computations that may not significantly contribute to image recognition quality. However, some present techniques for reducing the number of computations typically involve at least partial evaluation of all attributes of an image and, furthermore, may require multiple processors for independently evaluating different portions and/or attributes of an image.

The present invention provides a new and improved apparatus and method which addresses the above-referenced problems.

SUMMARY

In one embodiment, a method for identifying a best item among a plurality of respective different items includes selecting a current best score, identifying a set of attributes associated with each of the items, and for each of the sets of attributes: determining a best possible score for a subset of the set of attributes, if the best possible score is greater than the current best score, determining an actual score for the set of attributes, and if the actual score for the set of attributes is greater than the current best score, setting the current best score as the actual score for the set of attributes. After both of the determining steps and the setting step for each of the sets of attributes, the item associated with the current best score is identified.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1:
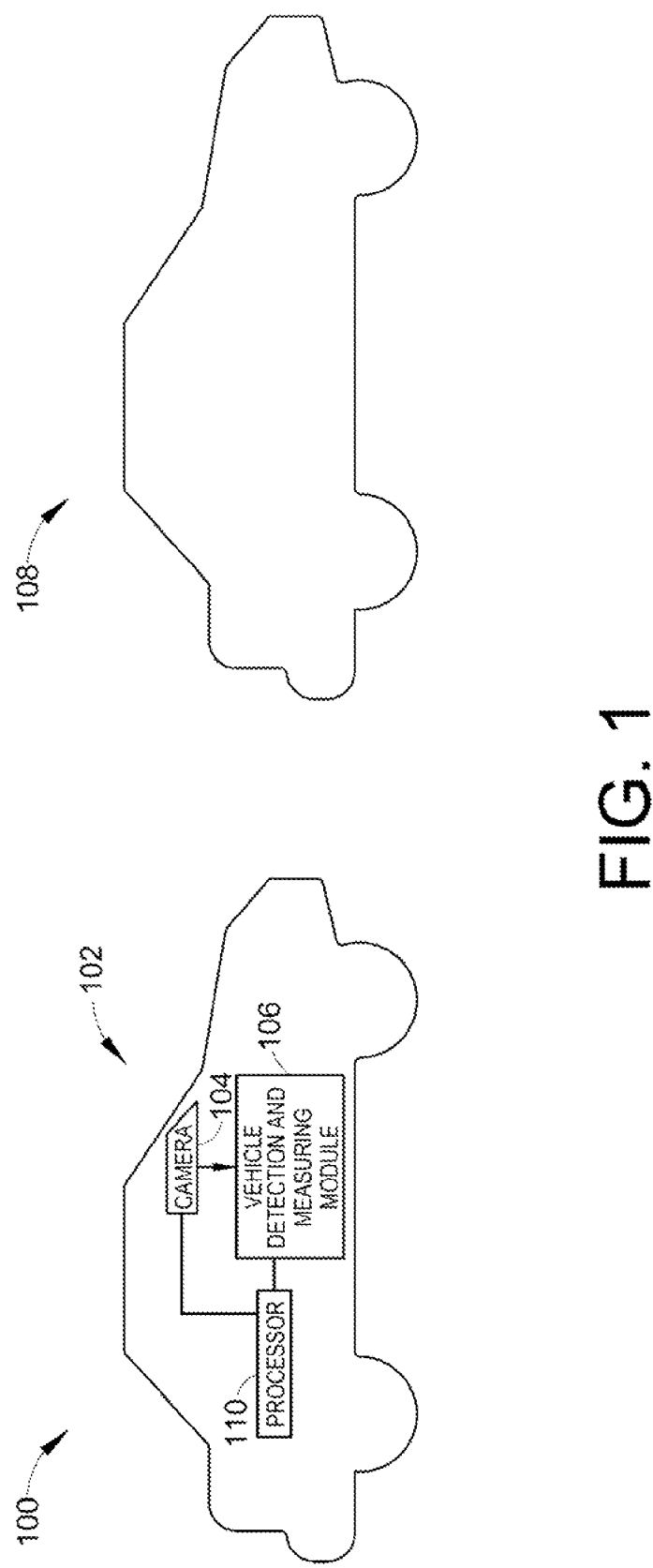
FIG. 1 illustrates a schematic representation of a vehicle including a system in accordance with one embodiment of an apparatus illustrating principles of the present invention.

FIG. 1 illustrates an example of a vehicle 100 equipped with an image based vehicle detection and distance measuring system 102. The image based vehicle detection and distance measuring system 102 comprises an image receiver 104 and a vehicle detection and measuring module 106 that is coupled with the image receiver 104. In the illustrated embodiment, the image receiver 104 is a camera. However, it is to be understood that any suitable image capturing device may be employed by the image based vehicle detection and distance measuring system 102. The vehicle detection and measuring module 106 includes logic for performing the functionality described herein.

The image-based vehicle detection and distance measuring processing module 106 detects objects (e.g., a forward vehicle 108) and measures distance based on edge segments and dark pixels during the day, and on bright areas at night. The edges and dark pixels are assembled into U or H shapes that surround the boundary of a vehicle. Rules describe the acceptable shapes, thus separating vehicles from the background. At nighttime, rules describe the pairing of the bright areas and identify the vehicles' left and right taillights to separate the vehicles from the background. The range to the vehicle can be estimated by using a flat road model or the relation between vehicle width in the image and distance. A scheme of pyramid resolution-reduced images can be used to maintain approximately constant processing times regardless of vehicle size.

Figure 2:
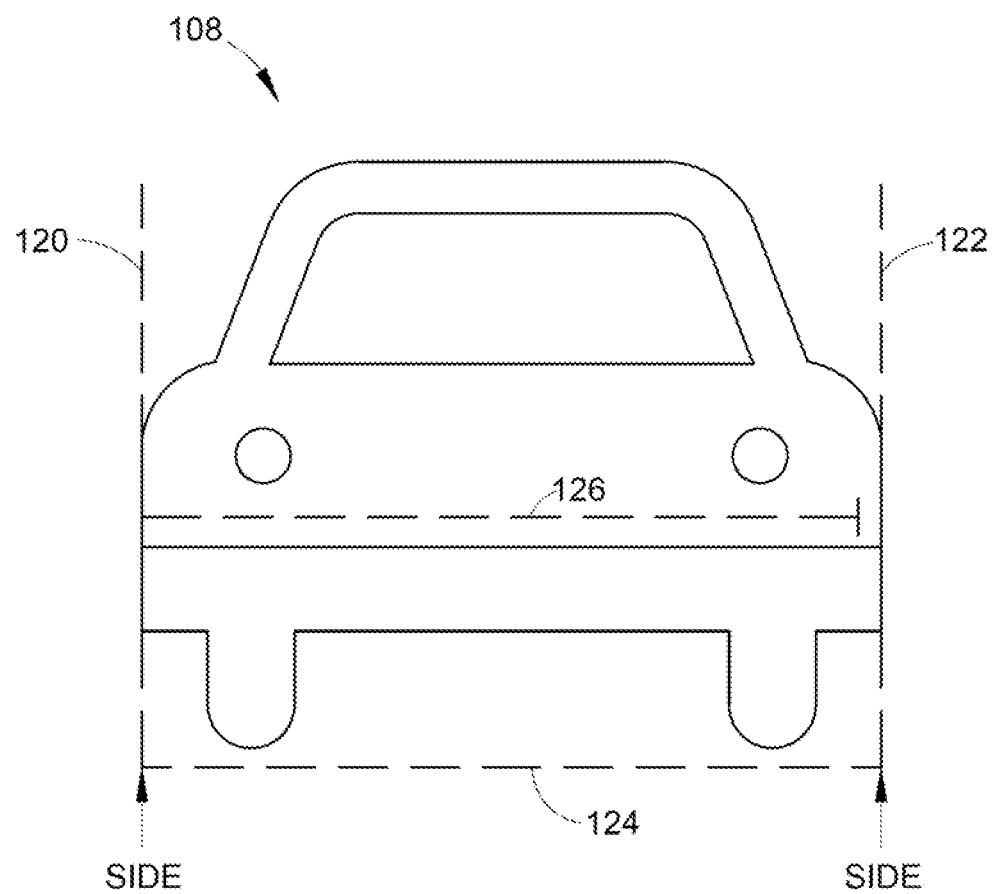
FIG. 2 illustrates a schematic representation of a edges defining a vehicle location in accordance with one embodiment of an apparatus illustrating principles of the present invention.

With reference to FIG. 2, edges are identified from locations of contiguous significant gradients. Dark image sections are located. A processor 110 (see FIG. 1) identifies U-shapes and H-shapes based on image data 130 (see FIG. 3) collected by the image receiver 104. For example, the vehicle 100 may be located based on a U-shape defined by two (2) vertical edges 120, 122 (e.g., a left vertical edge 120 and a right vertical edge 122) and a first horizontal edge 124 of the forward vehicle 108. Alternatively, the vehicle 100 may be identified based on an H-shape defined by the two (2) vertical edges 120, 122 and a second horizontal edge 126.

It is desirable to evaluate potential edges for identifying the best of two (2) vertical edges and a horizontal edge for locating a vehicle both quickly and utilizing a relatively lower amount of computing resources. Therefore, one embodiment of the present invention provides for evaluating image data efficiently and characterizing edges that will define a vehicle and only evaluate the data as long as is necessary to identify the best two (2) vertical edges and horizontal edge defining a vehicle. If current edges being evaluated are determined to not define a vehicle and/or to not model a vehicle as well as previously evaluated edge sets, the process stops evaluating the current edges and continues to evaluate remaining combinations of edges, thereby saving processing time and resources.

Figure 3:
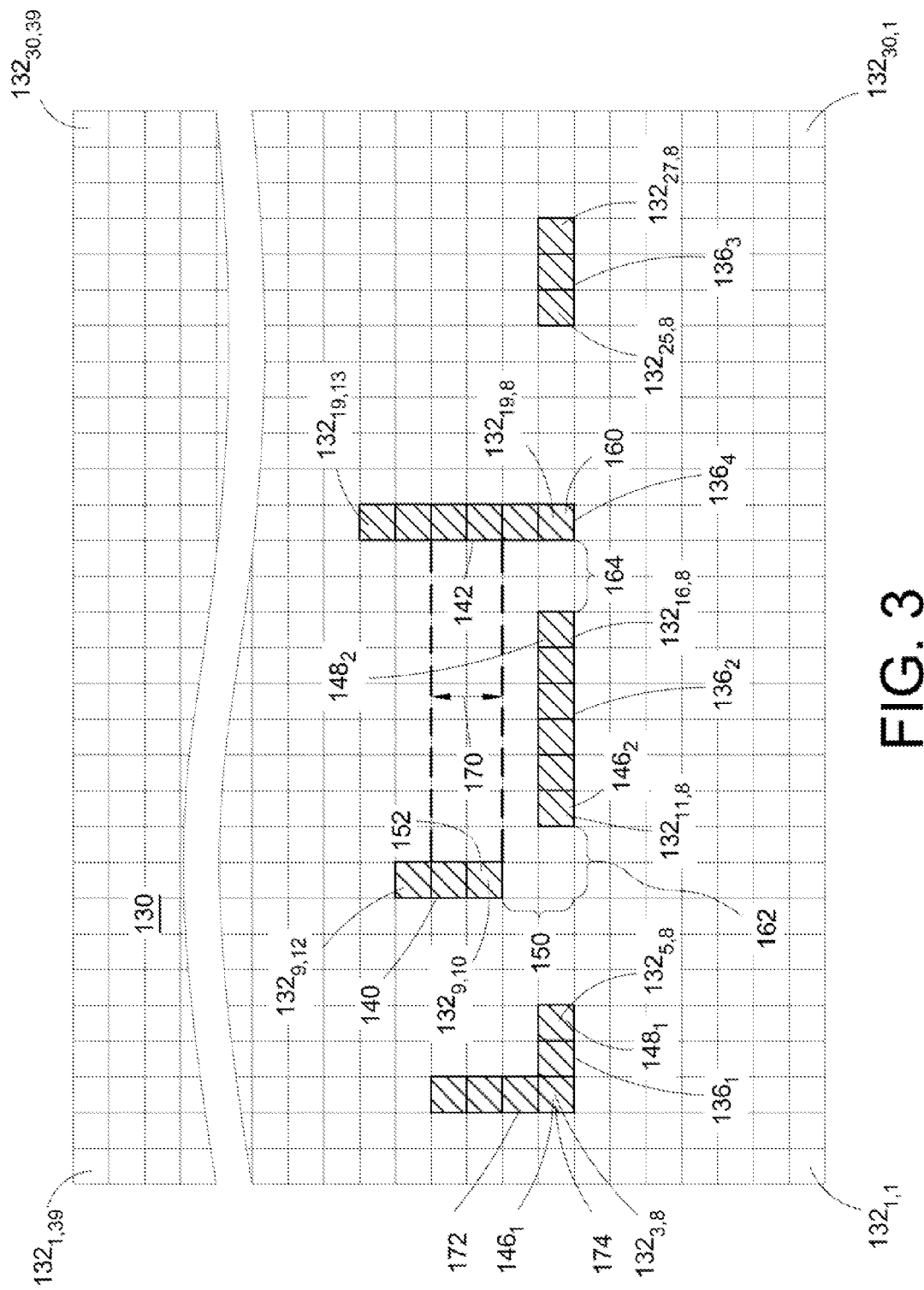
FIG. 3 illustrates a graphical representation of edge segments found in a vehicle location in accordance with one embodiment of an apparatus illustrating principles of the present invention.

With reference to FIG. 3, the image data 130 of the forward vehicle 108 (see FIGS. 1 and 2) may be represented as a plurality of pixels 132. Each of the pixels 132 represents an addressable element (e.g., a datum) in the image data 130. Typical image data 130 will include 256 pixels along the x-axis and 256 pixels along the y-axis. For ease of illustration, not all of the pixels are shown in FIG. 3. For example, although the image data 130 may include 256 pixels along each of the x-axis and the y-axis, only thirty (30) pixels 132 are illustrated along the x-axis and thirty-nine (39) pixels 132 are illustrated along the y-axis. Therefore, the image data 130 of the forward vehicle 108 illustrated in FIG. 3 includes the pixels $132_{1-30,1-39}$.

Each of the pixels 132 is either "dark" or "light." For purposes of discussion, it is assumed the dark pixels represent locations where object(s) (e.g., the edges 120, 122, 126 (see FIG. 2) of the forward vehicle 108 (see FIG. 2)) and/or shadows are detected in the image data 130, and the light pixels represent locations where no object (e.g., an edge or a shadow of a vehicle) is detected in the image data 130.

A pixel is "dark" if it has at least a predetermined contrast when compared with at least one neighboring pixel. For example, a gray-scale typically ranges from zero (0) to 255, with zero (0) representing black and 255 representing white. In one embodiment, the predetermined contrast identified for determining if a pixel is dark is whether there is a difference of at least eight (8) between the gray-scale values of the pixel and the at least one neighboring pixel. Therefore, if the pixel has a gray-scale value of 100 and the at least one neighboring pixel has a gray-scale value of 90, the difference is 10 (100–90) between the gray-scale values. In one embodiment, pixels having gray-scale values less than about 50 are also considered dark since, for example, such pixels may be an edge obscured by a shadow. For purposes of discussion, only pixels 132 having gray-scale values of either zero (0) or 256 are illustrated in FIG. 3. More specifically, the pixels 132 having a gray-scale value of zero (0) (i.e., the dark pixels) are shown as filled in FIG. 3 (see, for example, the pixels $132_{3-5,8}$), and the pixels 132 having a gray-scale value of 256 (i.e., the light pixels) are shown as unfilled in FIG. 3 (see, for example, the pixels $132_{3-5,7}$).

Figure 4:
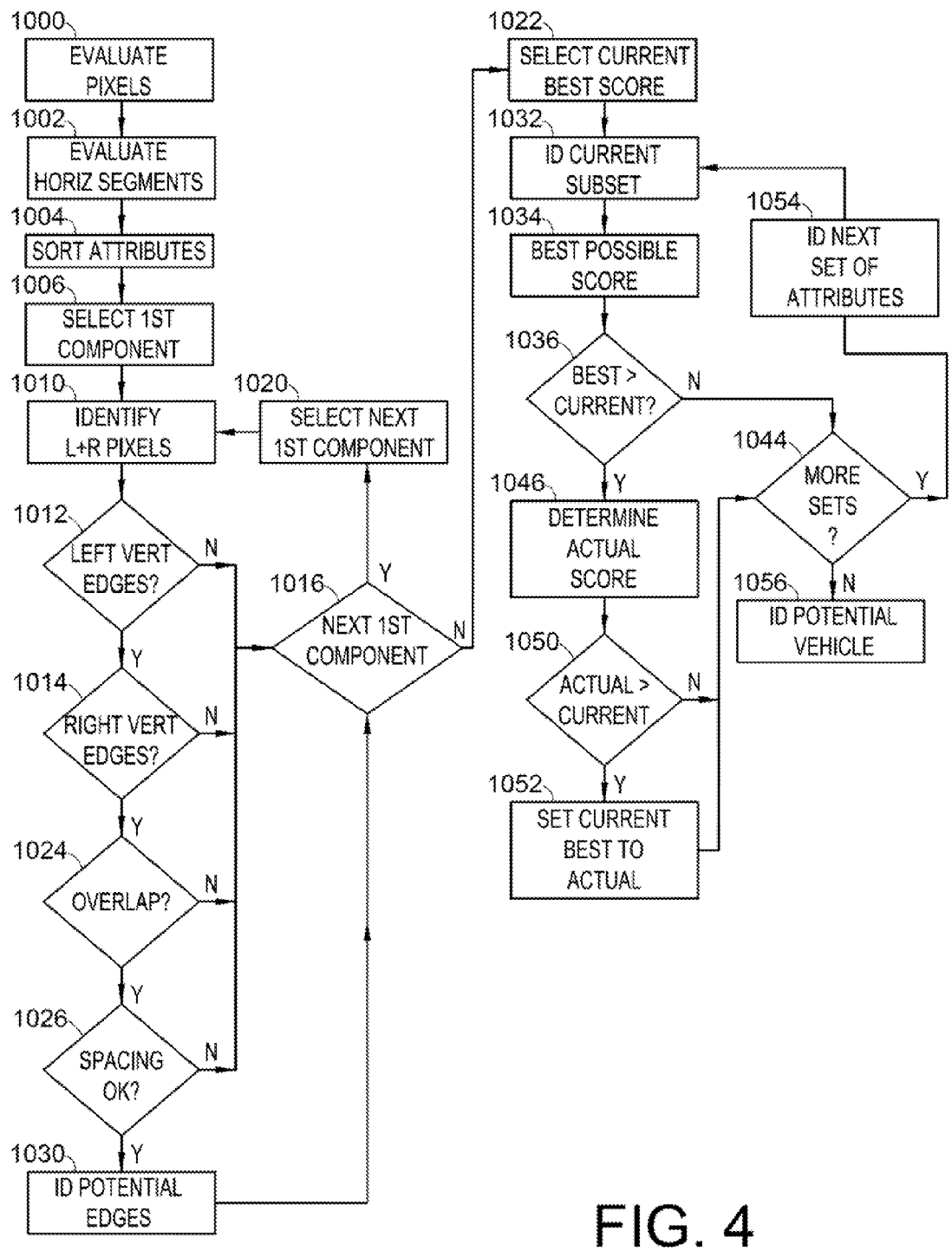
FIG. 4 is an exemplary methodology of evaluating image data in accordance with one embodiment illustrating principles of the present invention.

With reference to FIGS. 1, 3 and 4, a method for analyzing data for identifying combinations of the data meeting a minimum acceptable score is illustrated. Image data including a plurality of pixels of an image is received in the processor 110, and attributes of the data are identified. Each of the pixels is represented by a respective pixel datum. An attribute of the forward vehicle 108 (see FIG. 2) may be a fill percentage of an edge of the forward vehicle 108. In that case, a set of the attributes of the forward vehicle 108 may include a set of fill percentages of edges. For example, a set of fill percentages of edges of the forward vehicle 108 may include fill percentages for three (3) edges defining a U-shaped representation of the forward vehicle 108. It is contemplated that the three (3) edges used to define the U-shaped representation of the forward vehicle 108 are the first horizontal edge 124 and the two (2) vertical edges 120, 122. In this case, each of the fill percentages for the edges 124, 120, 122 is referred to as a component of the set of attributes. For purposes of discussion, the horizontal edge 124 fill percentage is referred to as the first component, the left vertical edge 120 fill percentage is referred to as the second component, and the right vertical edge 122 fill percentage is referred to as the third component.

In one embodiment, the rows of pixels 132 are evaluated from left to right in a step 1000 to identify horizontal segments, which may later be identified as potential horizontal edges. For example, a potential horizontal edge is identified as a horizontal segment including at least a predetermined number of horizontal contiguous pixels that appear as "dark" (e.g., visible) in a row of the image data 130. In one embodiment, the at least predetermined number of contiguous horizontal pixels required for identifying a potential horizontal edge is three (3) pixels. During the step 1000, the first row of pixels $132_{1-256,1}$ (e.g., $132_{1-30,1}$, as illustrated in FIG. 3) is scanned to identify any horizontal segments. If no horizontal segments are identified, the next (e.g., second) row of pixels $132_{1-256,2}$ (e.g., $132_{1-30,2}$, as illustrated in FIG. 3) is scanned. In the illustrated example, no potential horizontal segments are identified until row eight (8) of pixels $132_{1-256,8}$ (e.g., $132_{1-30,8}$, as illustrated in FIG. 3) is scanned. Four (4) potential horizontal segments $136_1$, $136_2$, $136_3$, $136_4$ are identified in the row of pixels $132_{1-256,8}$ (e.g., $132_{1-30,8}$, as illustrated in FIG. 3). The potential horizontal segment $136_1$ is identified as pixels $132_{3-5,8}$; the potential horizontal segment $136_2$ is identified as pixels $132_{11-16,8}$; the potential horizontal segment $136_3$ is identified as pixels $132_{25-27,8}$; and the potential horizontal segment $136_4$ is identified as the pixel $132_{19,8}$. For purposes of discussion, only four (4) potential horizontal segments $136_1$, $136_2$, $136_3$, $136_4$ are illustrated in the image data 130. However, it is to be understood that any number of horizontal segments in any of the rows may be included in the image data 130.

Each of the horizontal segments $136_1$, $136_2$, $136_3$, $136_4$ is evaluated in a step 1002 to identify which of the horizontal segments, if any, include at least the predetermined number of horizontal contiguous pixels and, therefore, will be identified as potential horizontal edges. In the illustrated example, the first horizontal segment $136_1$ is identified as the pixels $132_{3-5,8}$, which includes three (3) horizontal pixels (i.e., the pixels 3-5 in the row 8). More specifically, since the first horizontal segment $136_1$ includes the pixels 3-5 (i.e., three (3) pixels) in a horizontal row, the first horizontal segment $136_1$ is identified as a potential horizontal edge. The second and third horizontal segments $136_2$, $136_3$ also include at least the predetermined number of horizontal contiguous pixels and, therefore, will be identified as potential horizontal edges. More specifically, the second horizontal segments $136_2$ includes six (6) pixels, and the third horizontal segment $136_3$ includes three (3) pixels. However, the fourth horizontal segment $136_4$ only includes one (1) contiguous horizontal pixel and, therefore, is not identified in the step 1002 as a horizontal edge. Therefore, in the illustrated example, the step 1002 evaluates and identifies each of the horizontal segments $136_1$, $136_2$, $136_3$ as respective potential horizontal edges, while the horizontal segment $136_4$ is not identified as a potential horizontal edge.

The potential horizontal segments $136_1$, $136_2$, $136_3$ (e.g., the first components) are sorted, in a step 1004, according to the respective number of pixels in the potential horizontal edges $136_1$, $136_2$, $136_3$. For example, as discussed above, since all of the horizontal segments include at least the predetermined number of horizontal contiguous pixels, each of the potential horizontal edges $136_1$, $136_2$, $136_3$ is included in the sort. Optionally, in the step 1004, the first components $136_1$, $136_2$, $136_3$ (e.g., horizontal edges) of the attribute sets are sorted in a descending order according to the respective number of pixels in the horizontal edge. In the illustrated example, the first component $136_1$ of the first potential edge includes three (3) pixels, the first component $136_2$ of the second potential edge includes six (6) pixels, and the first component $136_3$ of the third potential edge includes three (3) pixels. Therefore, the potential edges are sorted, optionally in a descending order, according to the first components as $136_2$ (6 pixels), $136_1$ (3 pixels), $136_3$ (3 pixels) in the step 1004. Since the first components $136_1$ and $136_3$ both include 3 pixels, the first components $136_1$ and $136_3$ can be ordered as either $136_1$, $136_3$ or $136_3$, $136_1$ in the step 1004.

In a step 1006, a current first component is selected. In the illustrated embodiment, the sorted first components are selected in a decreasing order. Therefore, the current first component is selected as $136_2$ in the step 1006.

A left most pixel of the current first component (e.g., current potential horizontal segment) and a right most pixel of the current first component (e.g., current potential horizontal segment) are identified in a step 1010. In a step 1012, a determination is made whether any potential left vertical edges of at least the predetermined number (e.g., three (3) pixels) of contiguous vertical pixels have a left bottom pixel within a predetermined number of horizontal pixels and within a predetermined number of vertical pixels away from the left most pixel of the current first component. In a step 1014, a determination is made whether any potential right vertical edges of the predetermined number (e.g., three (3) pixels) of contiguous vertical pixels have a right bottom pixel within the predetermined number of horizontal pixels and within the predetermined number of vertical pixels away from the right most pixel of the current first component. In one embodiment, the predetermined number of horizontal pixels is five (5), and the predetermined number of vertical pixels is five (5). However, other numbers of pixels are also contemplated for the predetermined number of horizontal and vertical pixels. If more than one potential left vertical edge exists, it is to be understood each of the potential left vertical edges may be sorted so that the strongest potential left vertical edge is evaluated first. Similarly, if more than one potential right vertical edge exists, it is to be understood each of the potential right vertical edges may be sorted so that the strongest potential right vertical edge is evaluated first.

In the case when the current first component is $136_2$, the left most pixel is identified as $146_2$ (e.g., $132_{11,8}$) and the right most pixel is identified as $148_2$ (e.g., $132_{16,8}$) in the step 1010. In the illustrated example, a possible left vertical edge is a vertical segment 140 at pixels $132_{9,10\text{-}12}$, which has a bottom pixel 152 (e.g., $132_{9,10}$). In addition, a possible right vertical edge is a vertical segment 142 at pixels $132_{19,8\text{-}13}$, which has a bottom pixel 160 (e.g., $132_{19,8}$). Since both the left vertical segment 140 and the right vertical segment 142 are at least three (3) pixels long, both of those segments 140, 142 have at least the predetermined number of contiguous vertical pixels to be respective potential vertical edges.

Since the bottom pixel 152 (e.g., $132_{9,10}$) of the vertical segment 140 is two (2) horizontal pixels (see gap 162) and two (2) vertical pixels (see gap 150) from the left most pixel $146_2$ of the current first component $136_2$, the vertical segment 140 is determined in the step 1012 to be a potential left vertical edge for the current first component (e.g., the potential horizontal edge $136_2$). In other words, the distance of two (2) horizontal pixels is less than the predetermined number of horizontal pixels (e.g., five (5)), and the distance of two (2) vertical pixels is less than the predetermined number of vertical pixels (e.g., five (5)). Furthermore, since the bottom pixel 160 (e.g., $132_{19,8}$) of the right vertical segment 142 is three (3) horizontal pixels (see gap 164) and zero (0) vertical pixels from the right most pixel $148_2$ (e.g., $132_{16,8}$) of the current first component is $136_2$, the vertical segment 142 is determined in the step 1014 to be a potential right vertical edge for the current first component (e.g., the potential horizontal edge $136_2$). In other words, the distance of three (3) horizontal pixels is less than the predetermined number of horizontal pixels (e.g., five (5)), and the distance of zero (0) horizontal pixels is less than the predetermined number of vertical pixels (e.g., five (5)).

If it is determined in the step 1012 that a potential left vertical edge is associated with the current first component $136_2$, control passes to the step 1014 for determining if a potential right vertical edge is associated with the current first component $136_2$. Otherwise, control passes to a step 1016 for identifying if a next first component exists. If a next first component exists, control passes to a step 1020 for selecting the next first component and then returning control to the step 1010 for identifying the left most pixel and the right most pixel of the next first component. Otherwise if no next first component is identified in the step 1016, control passes to a step 1022, which is discussed below. If it is determined in the step 1014 that a potential right vertical edge is associated with the current first component $136_2$, control passes to a step 1024 for determining if at least a predetermined number of overlap pixels overlap 170 and/or a minimum percentage of pixel overlap 170 between the left vertical segment 140 and the right vertical segment 142. Otherwise, control passes to the step 1016.

In the step 1024, the overlap 170 may be determined as at least a predetermined number of overlap pixels (e.g., two (2) pixels) overlap 170 and/or the minimum percentage (e.g., 40%) of pixel overlap 170 between the left vertical segment 140 and the right vertical segment 142. In one embodiment, the percentage of pixel overlap is the number of pixels that overlap (e.g., three (3) pixels in FIG. 4) out of a maximum effective length of the vertical segments 140, 142. For example, the maximum effective length of the vertical segments 140, 142 runs from the lowest pixel to the highest pixel of the vertical segments 140, 142. In FIG. 4, the lowest pixel of the vertical segments 140, 142 is the pixel $132_{19,8}$, and the highest pixel of the vertical segments 140, 142 is the pixel $132_{19,13}$. Therefore, the maximum effective length of the vertical segments 140, 142 runs from the pixel $132_{19,8}$, to the pixel $132_{19,13}$. In other words, the maximum effective length of the vertical segments 140, 142 is six (6) pixels (i.e., pixel $132_{19,8}$, up to and including pixel $132_{19,13}$). As noted above, the actual overlap between the left vertical segment 140 and the right vertical segment 142 is three (3) pixels. Therefore, the percentage of pixel overlap 170 is 50% (i.e., 3/6). If it is determined in the step 1024 that the left vertical segment 140 and the right vertical segment 142 overlap by at least the predetermined number of overlap pixels and/or the minimum percentage, control passes to a step 1026 for determining if a spacing between the left vertical segment 140 and the right vertical segment 142 is within a predetermined spacing range (e.g., greater than or equal to a minimum number of pixels and greater than or equal to a maximum number of pixels). Otherwise, if there is not sufficient overlap found in the step 1024, control passes to the step 1016.

In the step 1026, a determination is made whether the spacing between the left vertical segment 140 and the right vertical segment 142 is, for example, greater than or equal to four (4) pixels and less than or equal to twenty (20) pixels. In the current example, the spacing between the left vertical segment 140 and the right vertical segment 142 is nine (9)

pixels, which is within the predetermined spacing range. If the spacing between the left vertical segment 140 and the right vertical segment 142 is within the predetermined spacing range, control passes to a step 1030 for identifying the current first component (e.g., the potential horizontal edge 136$_2$) along with the associated left vertical segment 140 and right vertical segment 142 as a potential edges. Control then passes to the step 1016 for identifying if a next first component exists. Otherwise, control passes to the step 1016.

In the step 1016, if the current first component is 136$_2$, the next first component may be identified as 136$_1$. In that case, the current first component is selected as 136$_1$ in the step 1020. Then, in the step 1010, the left most pixel 146$_1$ of the current first component 136$_1$ is identified as the pixel 132$_{3,8}$, and the right most pixel 148$_1$ of the current first component 136$_1$ is identified as the pixel 132$_{5,8}$.

In the step 1012, a vertical segment 172 is determined as a potential left vertical edge associated with the current first component 136$_1$. Since the bottom pixel 174 (e.g., 132$_{3,8}$) of the vertical segment 172 is zero (0) horizontal pixels (i.e., less than the predetermined number (e.g., five (5) of horizontal pixels) and zero (0) vertical pixel (i.e., less than the predetermined number (e.g., five (5) of vertical pixels)) from the left most pixel 146$_1$ of the current first component 136$_1$, and since the vertical segment 172 includes at least three contiguous pixels, the vertical segment 172 is determined in the step 1012 to be a potential left vertical edge for the current first component (e.g., the potential horizontal edge 136$_1$). In the step 1014, the vertical segment 140 is determined as a potential right vertical edge associated with the current first component 136$_1$. Since the bottom pixel 152 (e.g., 132$_{9,10}$) of the vertical segment 140 is four (4) horizontal pixels (i.e., less than the predetermined number (e.g., five (5) of horizontal pixels)) and two (2) vertical pixels (i.e., less than the predetermined number (e.g., five (5) of vertical pixels)) from the right most pixel 148$_1$ of the current first component 136$_1$, and since the vertical segment 140 includes at least three contiguous pixels, the vertical segment 140 is determined in the step 1014 to be a potential right vertical edge for the current first component (e.g., the potential horizontal edge 136$_1$).

Since there is sufficient overlap of the predetermined number (e.g., two (2) and/or 40% (i.e., ⅖)) of overlap pixels, as determined in the step 1024, and the spacing between the vertical segments 172, 142 is within the predetermined spacing range in the step 1026, the current first component (e.g., the potential horizontal edge 136$_1$) along with the associated left vertical segment 172 and right vertical segment 140 are identified, in the step 1030, as a potential edges. Control then passes to the step 1016 for identifying if a next first component exists. Otherwise, if there is not sufficient overlap found in the step 1024, control passes to the step 1016.

In the step 1016, if the current first component is 136$_1$, the next first component may be identified as 136$_3$. In that case, the current first component is selected as 136$_3$ in the step 1020. Then, in the step 1010, the left most pixel 146$_3$ of the current first component 136$_3$ is identified as the pixel 132$_{25,8}$, and the right most pixel 148$_3$ of the current first component 136$_3$ is identified as the pixel 132$_{27,8}$.

In the step 1012, the vertical segment 142 is determined as a potential left vertical edge associated with the current first component 136$_3$. Since the bottom pixel 160 (e.g., 132$_{19,8}$) of the vertical segment 142 is six (6) horizontal pixels (i.e., greater than the predetermined number (e.g., five (5) of horizontal pixels)) from the left most pixel 146$_3$ of the current first component 136$_3$, control passes directly from the step 1012 to the step 1016 for identifying if a next first component exists.

It is to be understood that the horizontal segments 136$_1$ and 136$_2$ may be evaluated together as a single horizontal segment 136$_{1,2}$ including a gap, which includes the pixels 132$_{6-10,8}$. In this case, the result of steps 1010, 1012, 1014, 1024, 1026, and 1030 is that the vertical segment 172 may be identified as a possible left vertical edge of the horizontal segment 136$_{1,2}$, and the vertical segment 142 may be identified as a possible right vertical edge of the horizontal segment 136$_{1,2}$.

Another possibility is that the horizontal segments 136$_2$ and 136$_3$ may be evaluated together as a single horizontal segment 136$_{2,3}$ including gaps, which include pixels 132$_{17-18,8}$ and 132$_{19-24,8}$. However, since the vertical segment 142 intersects the horizontal segment 136$_{2,3}$ at a pixel 132$_{19,8}$, which is neither the left most pixel 132$_{11,8}$ nor the right most pixel 132$_{27,8}$, the horizontal segment 136$_{2,3}$ is not considered as a potential horizontal edge. Similarly, the horizontal segments 136$_1$, 136$_2$, 136$_3$ may be evaluated together as a single horizontal segment 136$_{1,2,3}$ including gaps, which include pixels 132$_{6-10,8}$, pixels 132$_{17-18,8}$, and 132$_{19-24,8}$. However, since the vertical segment 142 intersects the horizontal segment 136$_{1,2,3}$ at the pixel 132$_{19,8}$, which is neither the left most pixel 132$_{3,8}$ nor the right most pixel 132$_{27,8}$, the horizontal segment 136$_{1,2,3}$ is not considered as a potential horizontal edge.

In the step 1022, a current best score and a current set of potential edges are selected. The current best score represents a sum of the respective percentages for the three (3) components of each of the sets of edges. In one example, a current best score is selected as 225%. However, it is understood that any other current best score may be selected in the step 1022. The current set of potential edges includes a set of edges identified in the step 1036 above, which includes a horizontal edge, a left vertical edge, and a right vertical edge. For example, the horizontal edge 136$_2$, along with the left vertical edge 140, and the right vertical edge 142 are selected in the step 1022.

In a step 1032, a current subset of edges is identified. In one embodiment, the subset of edges is selected as the left and right vertical edges. In a step 1034, a best possible score including actual fill factors for the current subset of the edges (e.g., left and right vertical edges) is determined. More specifically, the actual percentage fill is used for the subset of the edges (e.g., left and right vertical edges) and a 100% fill is used for the remaining edge (e.g., the horizontal edge). For example, the left edge 140 is filled 50% (i.e., 3 of the 6 pixels 132$_{9,8-13}$ are filled), and the right edge 142 is 100% filled (i.e., 6 of the 6 pixels 132$_{19,8-13}$ are filled). Therefore, the best possible score is determined as 50% for the left vertical edge 140+100% for the right vertical edge 142+100% for the horizontal edge 136$_2$. In this case, the best possible score is 50%+100%+100%=250%.

In a step 1036, a determination is made whether the best possible score (i.e., 250%) is greater than the current best score (i.e., 225%). If the best possible score is not greater than the current best score, control passes to a step 1044 for determining if another set of potential edges has yet to be evaluated. If another set of attributes is available to be evaluated, control passes to a step 1054 for identifying the next set of potential edges. Control then returns to the step 1032. Otherwise, if it is determined in the step 1044 that no more sets of potential edges are available to be evaluated, control passes to a step 1056 for identifying a location of the potential forward vehicle 108 (e.g., item) based on the horizontal edge, the left vertical edge, and the right vertical edge associated with the current best score.

If it is determined in the step 1036 that the best possible score is greater than the current best score, control passes to a step 1046 for determining an actual score for the current set of potential edges. In the illustrated example, the actual score for the horizontal edge $136_2$ is 55% (e.g., six (6) pixels $132_{11\text{-}16,8}$ are filled out of eleven (11) pixels $132_{9\text{-}19,8}$). In addition the actual fill percentage of the left possible edge 140 is determined between the maximum height of the left and right possible edges 140, 142 and the possible horizontal edge $136_2$. In the illustrated example, the right possible edge 142 extends higher (i.e., to pixel $132_{19,13}$) than the left possible edge 140 (i.e., to pixel $132_{19,13}$). Therefore, the actual fill percentages of the left and right possible edges 140, 142 are based on a higher height of the left and right possible edges 140, 142 from the possible horizontal edge $136_2$ (i.e., the right possible edge 142, which has a height of six (6) pixels). In this case, the actual fill percentage of the left possible edge 140 is 50% (i.e., 3/6), and the actual fill percentage of the right possible edge 142 is 100% (i.e., 6/6). The actual score for the current set of attributes is then 55% (i.e., the horizontal edge $136_2$)+50% (i.e., the left possible edge 140)+100% (the right possible edge 142), which is 205%.

A determination is made in a step 1050 if the actual score is greater than the current best score. If the actual score is greater than the current best score, the current best score is set to the actual score in a step 1052, after which control passes to the step 1044 to determine if another set of attributes (e.g., edges) has not yet been evaluated. If the actual score is not greater than the current best score in the step 1050, control also passes to the step 1044.

If it is determined in the step 1044 that more sets of potential edges are available to evaluate, as discussed above, a next set of potential edges is identified in the step 1054. For example, if the set of potential edges including the horizontal edge $136_2$, the left vertical edge 140, and the right vertical edge 142 has been evaluated, the set of potential edges including the horizontal edge $136_1$, the left vertical edge 172, and the right vertical edge 140 may be identified as the next set of potential edges in the step 1054.

Then, in the step 1032, the current subset may be identified as the left vertical edge 172 and right vertical edge 140 associated with the horizontal edge $136_1$. Using the actual fill value of 80% (i.e., 4/5) for the left vertical edge 172, 60% (i.e., 3/5) for the right vertical edge 140, and a maximum fill value of 100% for the horizontal edge $136_1$, the best possible score is determined in the step 1034 to be 240%. Since the best possible score is greater than the current actual score (i.e., 205%), which was previously set in the step 1052, control passes from the step 1036 to the step 1046 for determining the actual fill score of the horizontal edge $136_1$, the left vertical edge 172, and the right vertical edge 140.

In the step 1046, the actual fill value of the horizontal edge $136_1$ is 43% (3/7). Since, as noted above, the actual fill value of the left vertical edge 172 is 80% (i.e., 4/5), and the actual fill value of the right vertical edge 140 is 60% (i.e., 3/5), the actual fill score of the horizontal edge $136_1$, the left vertical edge 172, and the right vertical edge 140 is determined as 183% (i.e., 43%+80%+60%) in the step 1046. Since the actual fill value of 183% is determined in the step 1050 as less than the current actual score of 205%, control passes from the step 1050 to the step 1044 to determine if another set of potential edges has not yet been evaluated. For example, the horizontal segment $136_{1,2}$ associated with the vertical segment 172 and the vertical segment 140 may be identified as another set of attributes not yet evaluated.

If it is determined in the step 1044 that more sets of potential edges are available to evaluate, as discussed above, a next set of potential edges is identified in the step 1054. For example, if the set of potential edges including the horizontal edge $136_1$, the left vertical edge 172, and the right vertical edge 140 has been evaluated, the set of potential edges including the horizontal edge $136_{1,2}$, the left vertical edge 172, and the right vertical edge 142 may be identified as the next set of attributes in the step 1054.

Then, in the step 1032, the current subset may be identified as the left vertical edge 172 and the right vertical edge 142. The actual fill value of the left vertical edge 172 is determined as 67% (i.e., 4/6), and the actual fill value of the right vertical edge 142 is determined as 100% (i.e., 6/6). Therefore, the best possible score is determined in the step 1034 to be 267% (i.e., 67% for the left vertical edge 172+100% for the right vertical edge 142+100% maximum fill factor for the horizontal edge $136_{1,2}$). Since the best possible score is greater than the current actual score (i.e., 205%), which was previously set in the step 1052, control passes from the step 1036 to the step 1046 for determining the actual fill score of the horizontal edge $136_{1,2}$, the left vertical edge 172, and the right vertical edge 142.

In the step 1046, the actual fill value of the horizontal edge $136_{1,2}$ is 64% (i.e., nine (9) of the fourteen (14) pixels $132_{3\text{-}16,8}$ are filled). Since, as noted above, the actual fill value of the left vertical edge 172 is 67% (i.e., 4/6), and the actual fill value of the right vertical edge 142 is 100% (i.e., 6/6), the actual fill score of the horizontal edge $136_{1,2}$, the left vertical edge 172, and the right vertical edge 142 is determined as 231% (i.e., 64%+67%+100%) in the step 1046. Since the actual fill value of 231% is determined in the step 1050 as greater than the current actual score of 205%, control passes from the step 1050 to the step 1052 to set the current best score to the current actual score of 231%. Control then returns to the step 1044 to determine if another set of potential edges has not yet been evaluated.

After evaluating the set of attributes including the horizontal edge $136_{1,2}$, the left vertical edge 172, and the right vertical edge 142, it is determined in the step 1044 that no more sets of attributes are available to be evaluated. Therefore, control passes to the step 1056.

In the step 1056, the location of the potential forward vehicle 108 (e.g., item) (see FIG. 1) is identified based on the horizontal edge, the left vertical edge, and the right vertical edge associated with the current best score. Since the current best score of 231% is associated with the horizontal edge $136_{1,2}$, the left vertical edge 172, and the right vertical edge 142, the location of the potential forward vehicle 108 (e.g., item) (see FIG. 1) is identified based on the horizontal edge $136_{1,2}$, the left vertical edge 172, and the right vertical edge 142.

In one embodiment, the above steps are continuously repeated over time with, for example, new images. If the horizontal edge $136_{1,2}$, the left vertical edge 172, and the right vertical edge 142 are identified again over time, it serves as confirmation that the horizontal edge $136_{1,2}$, the left vertical edge 172, and the right vertical edge 142 represent the location of the potential forward vehicle 108 (e.g., item) (see FIG. 1).

An alternate embodiment for determining the best possible score (step 1034) is presented with respect to FIGS. 1, 3, 4, and 4a. In this embodiment, a score is determined according to an Equation 1, which is:

Score=% HorizontalFill*((1–% MaxHorizontal-
Gap)+% Overlap+((% LeftFill+% RightFill)/2))

In Equation 1, % HorizontalFill is a fill percentage of the horizontal edge; % MaxHorizontalGap is a percentage of pixels represented as a gap in the horizontal edge; % Overlap is the fill percentage between the highest and lowest points of the left and right edges; % LeftFill is a fill percentage of the left edge; and % RightFill is a fill percentage of the right edge. A best possible % HorizontalFill is 100%. A best possible % MaxHorizontalGap is 0%. A best possible % Overlap is the smaller of the left fill percentage and the right fill percentage. The best possible % LeftFill is 100%, and the best possible % RightFill is 100%.

For purposes of this example, it is assumed the current best score was selected as 200% in the step 1022.

Assuming the horizontal edge 136₂, along with the left vertical edge 140, and the right vertical edge 142 are selected as the current set of potential edges in the step 1022, a first sub-score is determined in a step 1034a based on the actual fill percentage of the left vertical edge 140, and best possible values for the other variables. As discussed above, the actual fill percentage of the left vertical edge 140 is 50%. Therefore, the first sub-score is determined in the step 1034a according to Equation 1 as:

Score=100% (i.e., best % HorizontalFill)*((100%–
0% (i.e., best % MaxHorizontalGap))+50%
(i.e., best % Overlap)+((50% (i.e., actual %
LeftFill)+100% (i.e., best % RightFill))/
2))=225%.

A determination is made in a step 1034b if the first sub-score is greater than the current best score. If the first sub-score is not greater than the current best score, control passes to the step 1044 for determining if another set of potential edges has yet to be evaluated. Otherwise, if the first sub-score is greater than the current best score, control passes to a step 1034c. In the current example, since the score of 225% is greater than the current best score of 200%, control passes to the step 1034c.

In the step 1034c, a second sub-score is determined based on the actual fill percentages for the left vertical edge 140 (e.g., 50%) and the right vertical edge 142 (e.g., 100%). Therefore, in the step 1034c, the second sub-score is determined according to Equation 1 as:

Score=100% (i.e., best % HorizontalFill)*((100%–
0% (i.e., best % MaxHorizontalGap))+50%
(i.e., best % Overlap)+((50% (i.e., actual %
LeftFill)+100% (i.e., actual % RightFill))/
2))=225%.

A determination is made in a step 1034d if the second sub-score is greater than the current best score. If the second sub-score is not greater than the current best score, control passes to the step 1044 for determining if another set of potential edges has yet to be evaluated. Otherwise, if the second sub-score is greater than the current best score, control passes to a step 1034e. In the current example, since the score of 225% is greater than the current best score of 200%, control passes to the step 1034e.

In the step 1034e, a third sub-score is determined based on the actual fill percentages for the left vertical edge 140 (e.g., 50%), the right vertical edge 142 (e.g., 100%), and the overlap 170 (e.g., 50%). Therefore, in the step 1034e, the third sub-score is determined according to Equation 1 as:

Score=100% (i.e., best % HorizontalFill)*((100%–
0% (i.e., best % MaxHorizontalGap))+50%
(i.e., actual % Overlap)+((50% (i.e., actual %
LeftFill)+100% (i.e., actual % RightFill))/
2))=225%.

A determination is made in a step 1034f if the third sub-score is greater than the current best score. If the third sub-score is not greater than the current best score, control passes to the step 1044 for determining if another set of potential edges has yet to be evaluated. Otherwise, if the third sub-score is greater than the current best score, control passes to a step 1034g. In the current example, since the score of 225% is greater than the current best score of 200%, control passes to the step 1034g.

In the step 1034g, a fourth sub-score is determined based on the actual fill percentages for the left vertical edge 140 (e.g., 50%), the right vertical edge 142 (e.g., 100%), the overlap 170 (e.g., 50%), and horizontal edge 136₂. Therefore, in the step 1034g, the fourth sub-score is determined according to Equation 1 as:

Score=55% (i.e., actual % HorizontalFill)*((100%–
0% (i.e., best % MaxHorizontalGap))+50%
(i.e., actual % Overlap)+((50% (i.e., actual %
LeftFill)+100% (i.e., actual % RightFill))/
2))=124%.

A determination is made in a step 1034h if the fourth sub-score is greater than the current best score. If the fourth sub-score is not greater than the current best score, control passes to the step 1044 for determining if another set of potential edges has yet to be evaluated. Otherwise, if the fourth sub-score is greater than the current best score, control passes to a step 1034i. In the current example, since the score of 124% is not greater than the current best score of 200%, control passes to the step 1044.

Figure 4A:
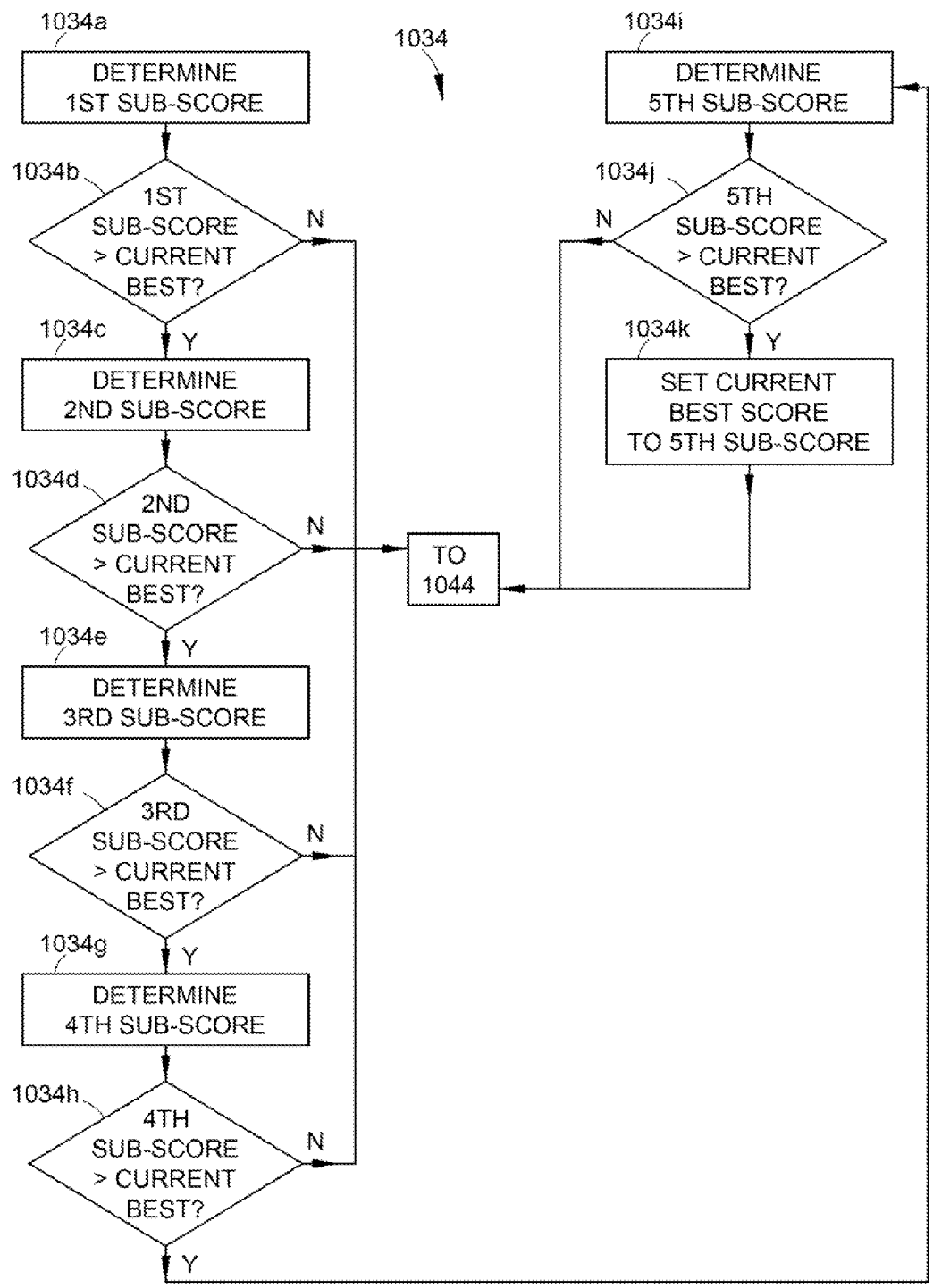
FIG. 4a is an exemplary methodology of step 1034 of FIG. 4 in accordance with one embodiment illustrating principles of the present invention.

Although control returned to the step 1044 in the present example, The remaining steps in FIG. 4a will be discussed. In the step 1034i, a fifth sub-score is determined based on the actual fill percentages for the left vertical edge 140 (e.g., 50%), the right vertical edge 142 (e.g., 100%), the overlap 170 (e.g., 50%), and the maximum gap in the horizontal edge (e.g., 18%, which is 2 pixels 132₉₋₁₀,₈ out of 11 pixels 132₉₋₁₉,₈). Therefore, in the step 1034i, the fifth sub-score is determined according to Equation 1 as:

Score=55% (i.e., actual % HorizontalFill)*((100%–
18% (i.e., actual % MaxHorizontalGap))+50%
(i.e., actual % Overlap)+((50% (i.e., actual %
LeftFill)+100% (i.e., actual % RightFill))/
2))=114%.

A determination is made in a step 1034j if the fifth sub-score is greater than the current best score. If the fifth sub-score is not greater than the current best score, control passes to the step 1044 for determining if another set of potential edges has yet to be evaluated. Otherwise, if the fifth sub-score is greater than the current best score, control passes to a step 1034k. In the current example, since the score of 114% is not greater than the current best score of 200%, control passes to the step 1044.

In the step 1034k, the current best score is set to the fifth sub-score. Control passes to the step 1044.

Although the embodiment illustrated in FIG. 4a has only been described with reference to the subset of edges including the horizontal edge 136₂, the left vertical edge 140, and the right vertical edge 142, it is to be understood the steps referenced in FIG. 4a can be applied to any subset of edges.

Figure 5:
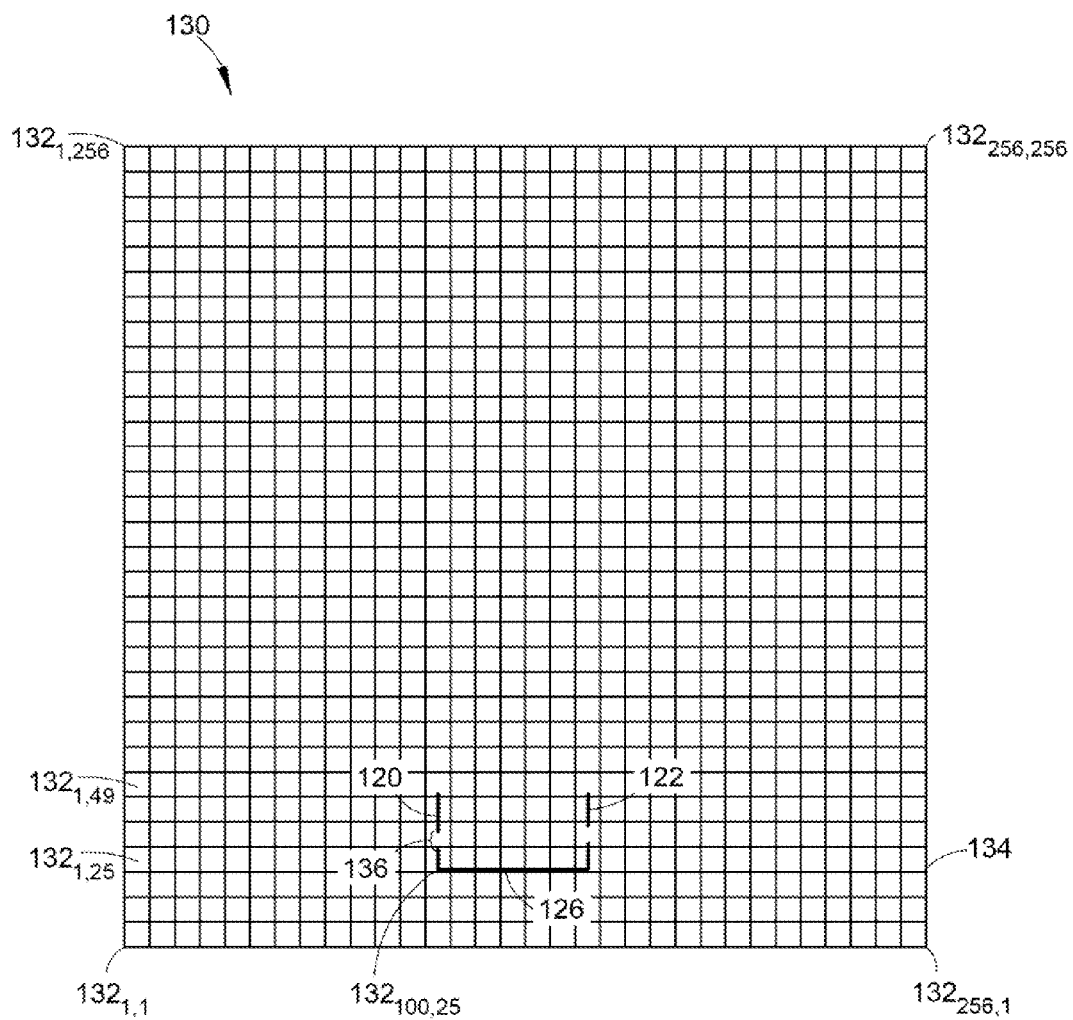
FIG. 5 illustrates a schematic representation of edges defining a vehicle in accordance with another embodiment of an apparatus illustrating principles of the present invention.
Figure 6A:
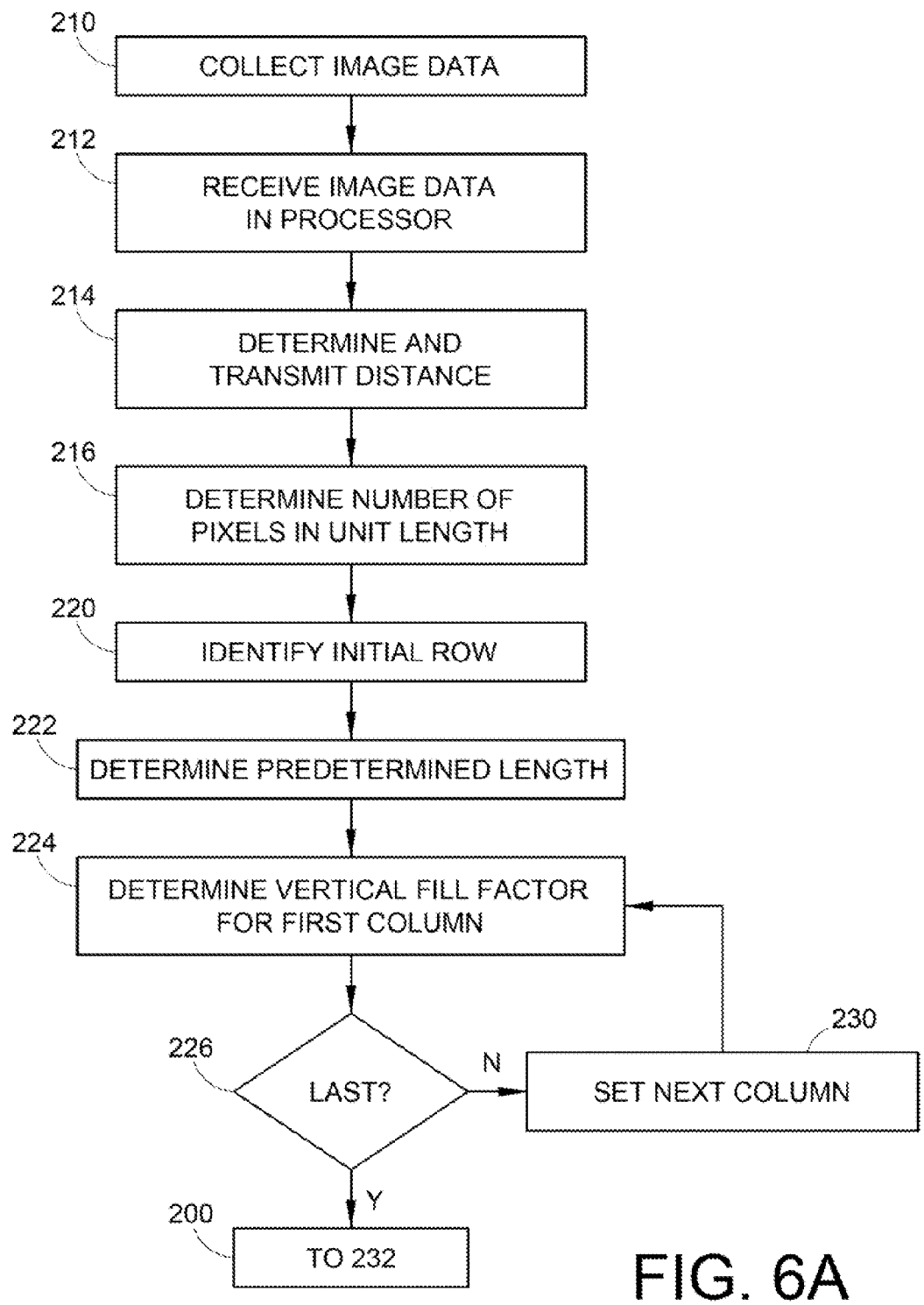
FIGS. 6a and 6b are an exemplary methodology of evaluating image data in accordance with the embodiment of FIG. 5 illustrating principles of the present invention.
Figure 6B:
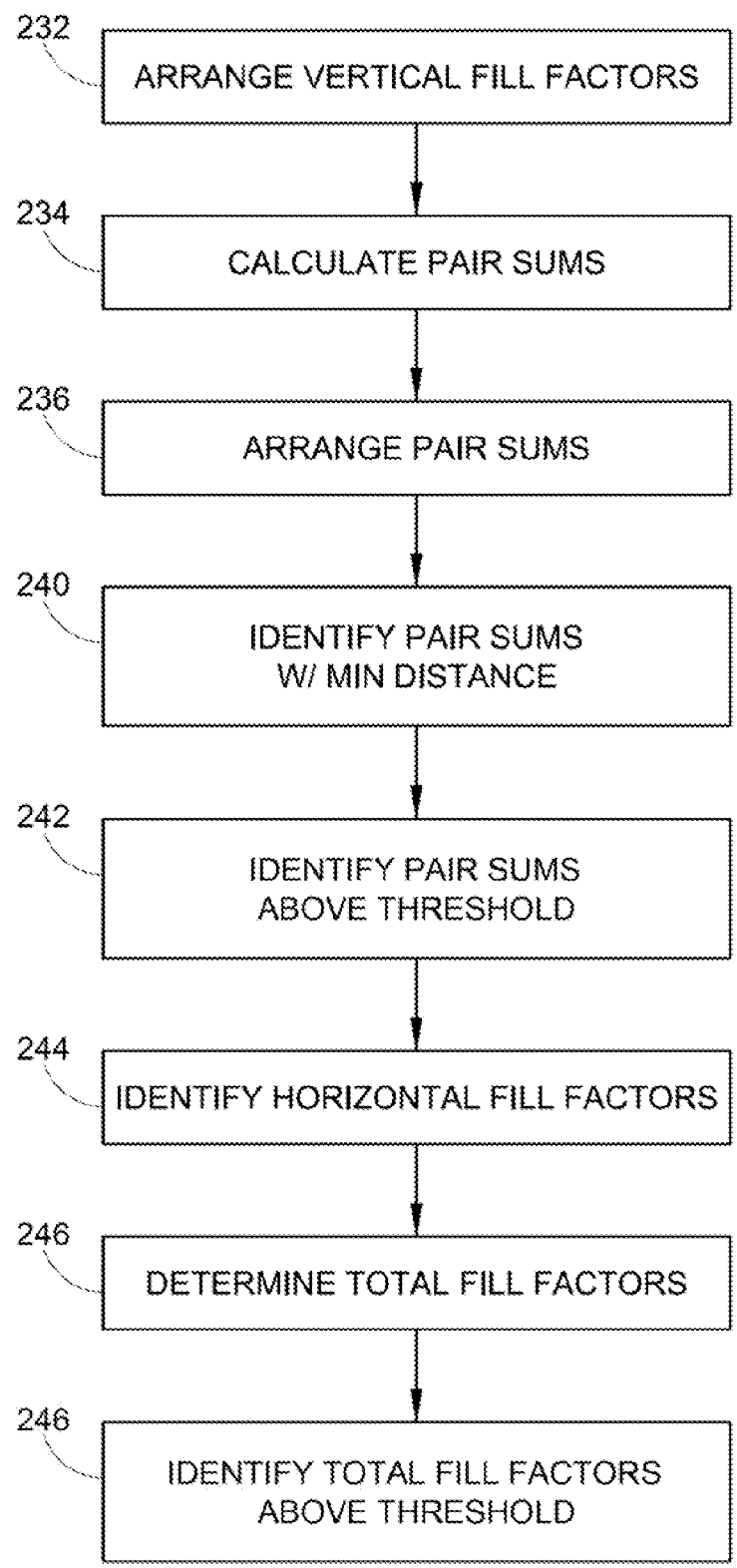

Another embodiment of the present invention is illustrated with respect to FIGS. 5, 6a, and 6b.

With reference to FIGS. 1, 5, 6a, and 6b, the image data 130 is collected, in a step 210, by the image receiver 104 on the vehicle 100. The image data 130 is received in the processor 110 in a step 212. The vehicle detection and measuring module 106 determines a distance to the forward vehicle 108 using, for example, a radar signal and transmits the distance to the processor 110 in a step 214.

Based on the distance to the forward vehicle 108 received in the step 214, the processor 110 determines a number of the pixels 132 in a unit length (e.g., one (1) meter) in a step 216. In one embodiment, the number of the pixels 132 in the unit length is the same in both the vertical direction (e.g., the y-direction) and the horizontal direction (e.g., the x-direction) in the image data 130.

An initial row 134 of the pixels 132 is identified in a step 220. It is contemplated that the initial row 134 is selected to be a predetermined distance from a bottom of the vehicle. Therefore, if the initial row 134 is desired to be about one (1) meter from a bottom of the forward vehicle 108 and if it is determined in the step 216 that twenty-five of the pixels 132 in the image data 130 correspond to one (1) meter, the initial row 134 is identified in the step 220 as the pixels $132_{1\text{-}256,25}$.

A respective vertical fill factor is determined along each of the columns in the initial row 134. For example, in a step 222, a predetermined length (and a corresponding number of the pixels 132) for the vertical fill factor in each column is determined. In one embodiment, it is determined that the vertical fill factor for each of the columns will be determined for one (1) meter (e.g., twenty-five (25) pixels 132). Therefore, in a step 224, the vertical fill factor is determined for the first column in the initial row 134. More specifically, in the illustrated example, the vertical fill factor is determined for the twenty-five consecutive pixels starting at the first (e.g., left-most) pixel in the initial row (i.e., starting with the pixel $132_{1,25}$). Therefore, the vertical fill factor for the first column is determined according to the pixels $132_{1,25\text{-}49}$ (which includes twenty-five pixels in the first column).

In one embodiment, the vertical fill factor is determined as a percentage of the pixels that are dark. In the illustrated example, twenty (20) of the twenty-five (25) pixels in the 100th column $132_{100,25\text{-}49}$ are dark, since a gap 136 exists in the image data 130. Gaps may exist in the image data 130 even along an edge of the forward vehicle 108 due to reflections, artifacts, etc. received by the image receiver 104 in the step 210. Since the illustrated example includes 20/25 dark pixels out of the pixels $132_{100,25\text{-}49}$, the vertical fill factor for the 100th column is determined as 80%.

After the vertical fill factor is determined in the step 224, control passes to a step 226 to determine if the vertical fill factor has been determined for the last column. If the vertical fill factor has not been determined for the last column, control passes to a step 230 to set the next column (e.g., after the pixels $132_{1,25\text{-}49}$ are evaluated, the second column pixels $132_{2,25\text{-}49}$ are set as the current pixels). Control then returns to the step 224 to determine the vertical fill factor for the current column. If it is determined in the step 226 that the vertical fill factor has been determined for the last column (e.g., for the pixels$_{256,25\text{-}49}$), control passes to a step 232.

In the step 232, the vertical fill factors for the columns in the initial row 134 are arranged in a descending order. A pair sum is identified as a sum of a pair of the vertical fill factors for two (2) different columns. In a step 234, respective pair sums are calculated for the vertical fill factors for the columns in the initial row 134. In one embodiment, the pair sums are calculated using the highest vertical fill factors first. For example, if the vertical fill factors in the decreasing order for the initial row 134 are 90% (i.e., 0.9), 85%, 80%, 70% . . . 15%, 10%, 2%, then the pair sums are calculated as 90%+85% (i.e., 175%), 90%+80% (i.e., 170%), 85%+ 80% (i.e., 165%), 90%+70% (i.e., 160%) . . . 10%+2% (i.e., 12%). Optionally, in order to reduce the required amount of processing and (and time), only the vertical fill factors above a predetermined threshold (e.g., above 60%) are used for determining the pair sums. In a step 236, the pair sums are arranged in a decreasing order. In the present example, the pair sums are already presented in a decreasing order (i.e., 175%, 170%, 165%, 160% . . . 12%). The step 236 ensures pair sums are in the decreasing order.

As discussed above, a vehicle may be defined according to a U-shape. In the illustrated example, the pairs of vertical fill factors associated with the pair sums represent potential edges (e.g., sides) of the forward vehicle 108, which are represented as columns in the image data 130. Therefore, a minimum distance (e.g., one (1) meter) between the columns in the pair sums must be present. The pair sums having the minimum distance between the columns are identified in a step 240. For example, a minimum distance of one (1) meter corresponds to twenty-five pixels 132 in the present example. Therefore, in the step 240, only the pair sums having vertical fill factors representing columns at least twenty-five pixels apart are identified.

In a step 242, the pair sums identified in the step 240 are evaluated to identify those having a pair sum above a predetermined threshold. In one embodiment, the predetermined threshold is 160%. Therefore, in the example discussed above the pair sums of 175%, 170%, and 165% are greater than the predetermined threshold of 160%. A total fill factor for the U-shape includes both of the vertical fill factors and a horizontal fill factor between the two (2) vertical fill factors. If a total fill factor of at least 260% is desired, all of the pair sums identified in the step 242 would offer a maximum calculated fill factor of at least 260%, if the horizontal fill factor between the two (2) vertical fill factors is 100%. For example, if horizontal fill factor between the two (2) vertical fill factors of the 175% pair sum is 100%, the maximum calculated fill factor is 275% (i.e., 175% (90%+85% for the two (2) vertical fill factors)+a potential horizontal fill factor of 100%). Therefore, the respective maximum calculated fill factors include the best case scenario horizontal fill factor (e.g., 100%) combined with the known vertical fill factors. In the example discussed above, the maximum calculated fill factors are 275% (175%+ 100%), 270% (170%+100%), 265% (165%+100%), and 260% (160%+100%).

The respective horizontal fill factors for each of the pair sums identified in the step 242 are identified in a step 244. For each of the pair sums, the horizontal fill factor represents a percentage of the pixels 132 that are "dark" between the columns represented by the vertical fill factors for that pair sum. For example, the horizontal fill factor for the pair sum of 275% is 40%, the horizontal fill factor for the pair sum of 270% is 50%, the horizontal fill factor for the pair sum of 265% is 80%, and the horizontal fill factor for the pair sum of 260% is 50%.

In a step 246, the total fill factors are determined for the respective pair sums. Therefore, the total fill factor for the 275% pair sum is 315% (275%+40%), the total fill factor for the 270% pair sum is 320% (270%+50%), the total fill factor for the 265% pair sum is 345% (265%+80%), and the total fill factor for the 260% pair sum is 310% (260%+50%).

In a step 250, a total fill factor above a predetermined total fill factor threshold is identified. In one example, if the predetermined total fill factor threshold is 340%, the total fill factor of 345% is identified as including the vertical edges and horizontal edge defining the forward vehicle 108. If more than one total fill factor is greater than the total fill factor threshold, the maximum total fill factor is selected for defining the forward vehicle 108.

Figure 7:
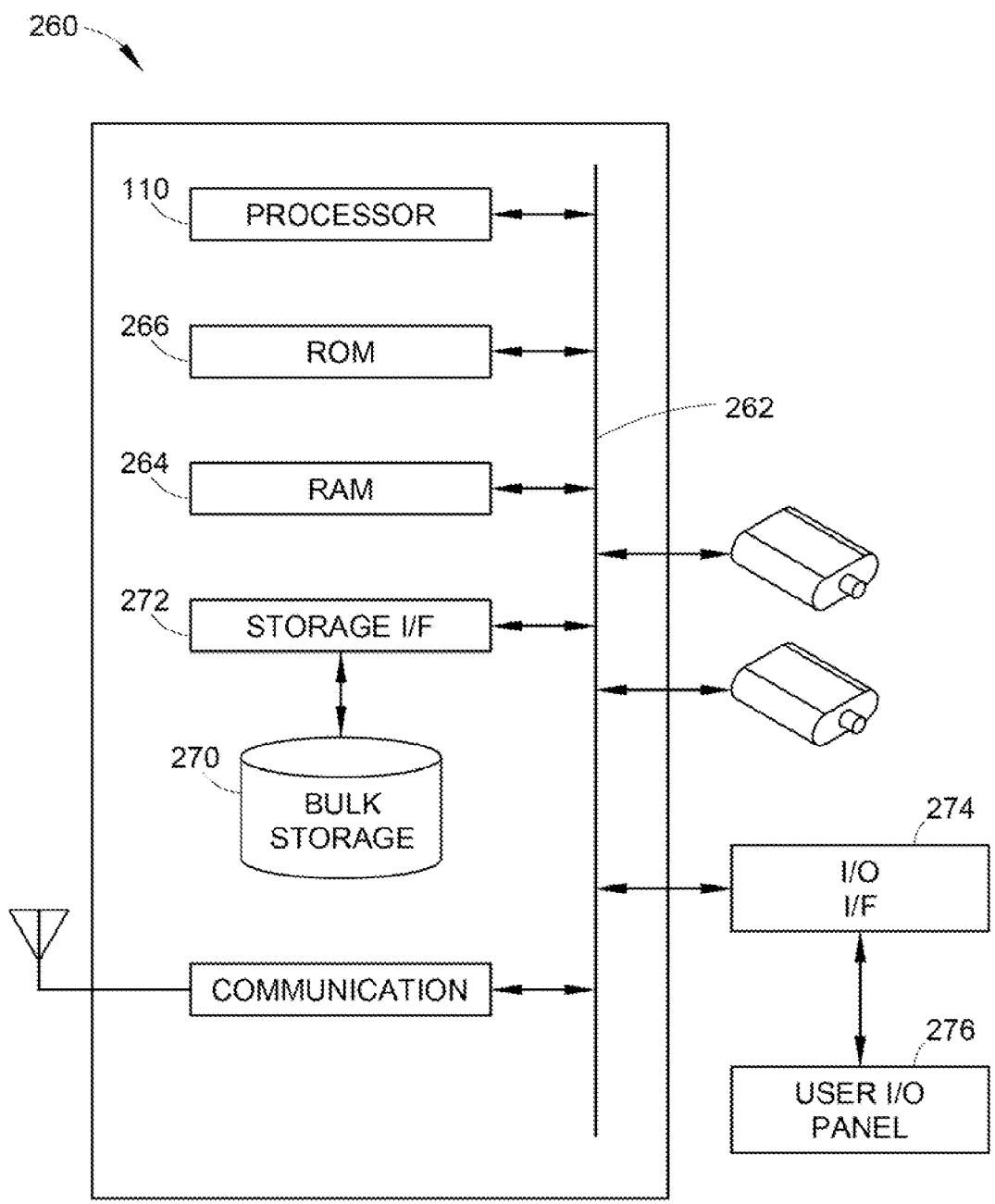
FIG. 7 illustrates a schematic representation of a computer system in accordance with one embodiment of an apparatus illustrating principles of the present invention.

With reference to FIG. 7, a block diagram illustrates a computer system 260 upon which any of the example embodiments discussed above may be implemented. The computer system 260 may be employed to implement the functionality of the vehicle detection and measuring module 106 described herein.

The computer system 260 includes a bus 262 or other communication mechanism for communicating information and the processor 110 coupled with the bus 262 for processing information. The computer system 260 also includes a main memory 264, such as random access memory (RAM) or other dynamic storage device coupled to the bus 262 for storing information and instructions to be executed by the processor 110. The main memory 264 also may be used for storing a temporary variable or other intermediate information during execution of instructions to be executed by the processor 110. The computer system 260 also includes a read only memory (ROM) 266 or other static storage device coupled to the bus 262 for storing static information and instructions for the processor 110. A storage device 270, such as a magnetic disk, optical disk, and/or flash storage for storing information and instructions is coupled to the bus 262 via a Storage Interface (I/F) 272.

The computer system 260 may be coupled via an Input/Output (I/O) (I/F) 274 to a user interface 276. The user interface 276 may suitably comprise a display such as a cathode ray tube (CRT) or liquid crystal display (LCD), for displaying information to a computer user. The user interface 276 may further comprise an input device, such as a keyboard including alphanumeric and other keys for communicating information and command selections to the processor 110. Another type of user input device is cursor control, such as a mouse, a trackball, cursor direction keys, and/or a touchscreen for communicating direction information and command selections to the processor 110 and for controlling cursor movement on the display. This input device typically has two degrees of freedom in two axes, a first axis (e.g. x) and a second axis (e.g. y) that allows the device to specify positions in a plane.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. A method for identifying a best item among a plurality of respective different items, the method comprising:
   receiving previously collected image data via an input;
   selecting a current best score based on the image data;
   identifying a set of attributes associated with each of the items;
   identifying respective first component values for each of the sets of attributes;
   identifying the first component values greater than a predetermined threshold value;
   sorting the first component values greater than the predetermined threshold value; and
   for each of the sets of attributes, for reducing a time to identify the item by:
      determining a best possible score for a subset of the set of attributes;
      if the best possible score is greater than the current best score, determining an actual score for the set of attributes; and
      if the actual score for the set of attributes is greater than the current best score, setting the current best score as the actual score for the set of attributes;
   for each of the sorted first component values greater than the predetermined threshold, performing both of the determining steps and the setting step in an order based on the sorted first component values;
   after both of the determining steps and the setting step for each of the sets of attributes, identifying the item associated with the current best score;
   transmitting data of the item, via an output, to a display; and
   displaying the item to a user.

2. The method for identifying a best item as set forth in claim 1, further including:
   for each of the sets of attributes, performing both of the determining steps and the setting step in a descending order of the sorted first component values.

3. The method for identifying a best item as set forth in claim 1, wherein the step of performing both of the determining steps and the setting step in an order based on the sorted first component values includes:
   for each of the sorted first component values greater than the predetermined threshold, performing both of the determining steps and the setting step in a descending order of the sorted first component values.

4. The method for identifying a best item as set forth in claim 1, wherein the step of determining the actual score for the set of the attributes includes:
   determining the actual score based on actual component values for each of a plurality of components of the set of attributes.

5. The method for identifying a best item as set forth in claim 1, wherein the step of identifying the set of attributes associated with each of the items includes:
   identifying the set of attributes as including a plurality of component values associated with each of the items.

6. The method for identifying a best item as set forth in claim 5, wherein the step of identifying the set of attributes as including a plurality of component values associated with each of the items includes:
   identifying a horizontal edge, a left vertical edge, and a right vertical edge of an object.

7. The method for identifying a best item as set forth in claim 6, wherein the step of determining the best possible score includes:
   determining the best possible score based on values of i) at least two of an actual fill percentage of the horizontal edge, an actual fill percentage of the left vertical edge, an actual fill percentage of the right vertical edge, a maximum horizontal gap of the horizontal edge, and an overlap of the left and right vertical edges and ii) best values of the remaining of the horizontal edge, the left vertical edge, the right vertical edge, the maximum horizontal gap of the horizontal edge, and the overlap of the left and right vertical edges.

8. The method for identifying a best item as set forth in claim 7, wherein the step of determining the actual score for the set of attributes includes:

determining the respective actual fill values of the horizontal edge, the left vertical edge, and the right vertical edge.

9. The method for identifying a best item as set forth in claim 8, determining the actual fill values includes:
determining a percentage of the respective horizontal edge, left vertical edge, and right vertical edge present in an image; and
determining the respective actual fill values based on the percentages.

10. The method for identifying a best item as set forth in claim 6, further including:
determining if an actual left end pixel of the horizontal edge is within a predetermined distance of an actual bottom end pixel of the left vertical edge; and
determining if an actual right end pixel of the horizontal edge is within a predetermined distance of an actual bottom end pixel of the right vertical edge.

11. The method for identifying a best item as set forth in claim 6, further including:
determining if an overlap of the left vertical edge and the right vertical edge is above a predetermined threshold.

12. The method for identifying a best item as set forth in claim 6, further including:
if the horizontal edge, the left vertical edge, and the right vertical edge are identified again over time, confirming the horizontal edge, the left vertical edge, and the right vertical edge represent the object.

13. A controller for identifying a best item among a plurality of respective different items, the controller comprising:
means for receiving previously collected image data;
means for selecting a current best score based on the image data;
means for identifying a set of attributes associated with each of the items;
means for identifying respective first component values for each of the sets of attributes;
means for identifying the first component values greater than a predetermined threshold value;
means for sorting the first component values greater than the predetermined threshold value;
means for reducing a time to identify the item by evaluating each of the sets of attributes, comprising:
determining a best possible score for a subset of the set of attributes;
if the best possible score is greater than the current best score, determining an actual score for the set of attributes; and
if the actual score for the set of attributes is greater than the current best score, setting the current best score as the actual score for the set of attributes; and
for each of the sorted first component values greater than the predetermined threshold, means for performing both of the determining steps and the setting step in an order based on the sorted first component values;
means for identifying the item associated with the current best score and after each of the sets of attributes is evaluated;
means for transmitting data of the item to a display; and
means for displaying the item to a user.

14. The controller as set forth in claim 13, wherein the means for identifying:
performs the evaluation of each of the sets of attributes in a descending order of the sorted first component values.

15. The controller as set forth in claim 13, wherein the means for identifying:
identifies the first component values greater than a predetermined threshold value; and
sorts the first component values greater than the predetermined threshold value; and
performs the evaluation of each of the sets of attributes having the first component values greater than the predetermined threshold.

16. The controller as set forth in claim 13, wherein the means for identifying:
identifies the set of attributes as including a plurality of component values associated with each of the items.

17. The controller as set forth in claim 16, wherein the means for identifying:
identifies a horizontal edge, a left vertical edge, and a right vertical edge of an object.

18. The controller as set forth in claim 17, wherein the means for evaluating:
determining the best possible score based on values of i) at least two of an actual fill percentage of the horizontal edge, an actual fill percentage of the left vertical edge, an actual fill percentage of the right vertical edge, a maximum horizontal gap of the horizontal edge, and an overlap of the left and right vertical edges and ii) best values of the remaining of the horizontal edge, the left vertical edge, the right vertical edge, the maximum horizontal gap of the horizontal edge, and the overlap of the left and right vertical edges.

19. The controller as set forth in claim 18, wherein the means for evaluating:
determines the respective actual fill values of the horizontal edge, the left vertical edge, and the right vertical edge based on respective percentages of the horizontal edge, left vertical edge, and right vertical edge present in an image.

20. The controller as set forth in claim 17, wherein the means for evaluating:
determines if an actual left end pixel of the horizontal edge is within a predetermined distance of an actual bottom end pixel of the left vertical edge; and
determines if an actual right end pixel of the horizontal edge is within a predetermined distance of an actual bottom end pixel of the right vertical edge.

21. The controller as set forth in claim 17, wherein the means for evaluating:
determines if an overlap of the left vertical edge and the right vertical edge is above a predetermined threshold.

22. A controller for identifying a potential vehicle in an image, the controller comprising:
means for receiving previously collected image data;
means for selecting a current best score based on the image data;
means for identifying a set of attributes including three components associated with each of a plurality of potential vehicles in the image and sorting the sets of attributes according to a first of the components;
means for reducing a time to identify the potential vehicle by evaluating each of the sets of attributes of the potential vehicles based on the sorted first components above a predetermined value by:
determining a best possible score including a best possible sub-score for at most two of the components;
if the best possible score is greater than the current best score, determining an actual score based on actual component scores for all three of the components; and if the actual score is greater than the current best score, setting the current best score as the actual score;

means for identifying the potential vehicle as being represented by the components associated with the current best score after each of the sets of attributes is evacuated;

means for transmitting data of the item to a display; and means for displaying the potential vehicle to a user.

23. The controller for identifying a potential vehicle in an image as set forth in claim 22, wherein:

the means for identifying identifies the three components as a horizontal edge, a left vertical edge, and a right vertical edge of an object; and the means for evaluating:

determines if an actual left end pixel of the horizontal edge is within a predetermined distance of an actual bottom end pixel of the left vertical edge; and determines if an actual right end pixel of the horizontal edge is within a predetermined distance of an actual bottom end pixel of the right vertical edge.

24. The controller for identifying a potential vehicle in an image as set forth in claim 23, wherein the means for evaluating:

determines if an overlap of the left vertical edge and the right vertical edge is above a predetermined threshold.

* * * * *